United States Patent [19]
Carbone et al.

[11] Patent Number: 5,717,199
[45] Date of Patent: Feb. 10, 1998

[54] COLLECTIVE CHARGE READING AND INJECTION IN RANDOM ACCESS CHARGE TRANSFER DEVICES

[75] Inventors: Joseph Carbone, Liverpool, N.Y.; M. Bonner Denton, Tucson, Ariz.; Stephen W. Czebiniak, Port Crane, N.Y.; Jeffrey J. Zarnowski, McGraw, N.Y.; Steven N. VanGorden, Waterloo, N.Y.; Michael J. Pilon, Framingham, Mass.

[73] Assignee: CID Technologies, Inc., Liverpool, N.Y.

[21] Appl. No.: 592,789

[22] Filed: Jan. 26, 1996

[51] Int. Cl.[6] .................................................. H04N 5/335
[52] U.S. Cl. .................... 250/208.1; 348/308; 348/306
[58] Field of Search ........................ 250/208.1; 348/308, 348/306, 304, 302, 307

[56] References Cited

U.S. PATENT DOCUMENTS

| | | | |
|---|---|---|---|
| 4,612,578 | 9/1986 | Breithaupt | 358/212 |
| 4,786,831 | 11/1988 | Morse et al. | 307/490 |
| 5,043,820 | 8/1991 | Wyles et al. | 358/213.28 |
| 5,262,871 | 11/1993 | Wilder et al. | 358/213.11 |
| 5,452,004 | 9/1995 | Roberts | 348/301 |

OTHER PUBLICATIONS

Breithaupt, D.W., "General Electric Profile Camera," Society of Manufacturing Engineers, Vision '86 Conference, 1986.

Grafinger, Alan B. and Michon, Gerald J., "Review of Charge Injection Device (CID) Technology," General Electric Reentry Systems Division and General Electric Corporate Research & Development, 1980.

McQuerry, James P., Jr. and Wargocki, Frank E., "A User's Guide to the BASD Soid–State Tracker," Annual Rocky Mountain Guidance and Central Conference, Rocky Mountain Section American Astronautical Society, 1985.

Michon, G.J., Burke, H.K., Vogelsong, T.L., and Merola, P.A., "Charge Injection Device (CID) Hadamard Focal Plane Processor for Image Bandwidth Compression," General Electric Technical Information Series, 1977.

NASA's Jet Propulsion Laboratory, "CCD/CID Processors Would Offer Greater Precision," NASA Technical Briefs, Oct., 1995, pp. 39 and 40.

NASA's Jet Propulsion Laboratory, "Fast Neural Solution of a Nonlinear Wave Equation," NASA Technical Briefs, Jan., 1996, pp. 79 and 80.

Wargocki, Frank E., Ray, Arthur J., and Hall, Gerald E., "Retroreflector Field Tracker," Ball Aerospace Systems Division, Boulder, Colorado, and NASA Marshall Space Flight Center, Huntsville, Alabama, 1985.

*Primary Examiner*—Edward P. Westin
*Assistant Examiner*—Alan L. Giles
*Attorney, Agent, or Firm*—Fish & Richardson P.C.

[57] ABSTRACT

Random access charge transfer devices are provided in which it is possible to simultaneously read electric charge that is stored within each detection element (pixel) that is in one of any desired combination of columns and that is also in one of any desired combination of rows. It is also possible to simultaneously read electric charge stored within each detection element or pixel in at least one selected column or row. In addition, it is possible to simultaneously cause injection of some or all of the electric charge stored in each detection element in one of any desired combination of columns and also in one of any desired combination of rows, or to simultaneously cause injection of some or all of the electric charge stored in each detection element in at least one selected column or row. In certain embodiments, a plurality of pre-amplifiers are connected to the column or row electrodes of the charge transfer device, for simultaneously producing a plurality of outputs, each output corresponding to the electric charge stored within at least one detection element or pixel in a single column or row, and a summation amplifier is provided having a feedback loop that is connected into each of the pre-amplifiers.

40 Claims, 4 Drawing Sheets

COLLECTIVE CHARGE READING AND INJECTION IN RANDOM ACCESS CHARGE TRANSFER DEVICES

BACKGROUND OF THE INVENTION

This invention relates to collective reading and collective charge injection of a multiplicity of pixels in random access charge transfer devices.

In charge coupled devices (CCDs), which are not random access devices, it is known to read out a multiplicity of pixels collectively. This process is sometimes referred to as "binning." When performing collective readout in a CCD, charge from several pixels is typically transferred into one pixel to increase the signal level for very low light levels. This has the advantage of reducing the read noise relative to the signal, because there is only one read for the charge collected under several pixels, and it also has the advantage of increased readout speed.

In random-access charge injection devices (CIDs), it is also known to read out a multiplicity of pixels collectively. In particular, Michon et al., "Charge Injection Device (CID) Hadamard Focal Plane Processor for Image Bandwidth Compression," and Grafinger et al., "Review of Charge Injection Device (CID) Technology" describe certain charge injection devices in which certain specific combinations of pixels can be read out collectively.

SUMMARY OF THE INVENTION

One aspect of the invention features a random access charge transfer device in which it is possible to simultaneously read electric charge that is stored within each detection element (pixel) that is in one of any desired combination of columns and that is also in one of any desired combination of rows.

By providing column and row selectors configured to select any desired combination of columns and rows for charge reading, and by providing charge transfer circuitry and charge reading circuitry that provide for simultaneous reading of electric charge stored in any desired combination of columns and rows, this aspect of the invention provides a very flexible collective reading arrangement uniquely useful for spectroscopy applications, in which arbitrary regions of interest are typically small and precisely located. The invention enables selection of any arbitrary small and precisely located region at will for rapid reading of the total charge accumulated in the region. In general imaging applications, the invention is particularly useful in collectively reading the total charge contained in arbitrary, dim, read noise limited areas of an image that also includes arbitrary strongly illuminated, shot noise limited areas. By collectively reading the total charge of the arbitrary dim area, it is possible to reduce the overall read noise associated with the arbitrary dim area. Similarly, the invention is particularly useful in collectively reading the total charge contained in arbitrary areas of an image having little or no detail of any importance relative to other arbitrary areas of the image, thereby making it possible to increase the speed of reading the image. In addition, prior to the simultaneous read, it is possible to individually scan each of the detection elements while the array of detection elements generates and stores electric charge in response to receipt of radiation, in order to identify a detection element associated with an unwanted high-energy event and eliminate the electric charge stored in that particular detection element from the simultaneous read.

Another aspect of the invention features a random access charge transfer device having a plurality of pre-amplifiers, connected to the column or row electrodes of the charge transfer device, for simultaneously producing a plurality of outputs, each output corresponding to the electric charge stored within at least one detection element (pixel) in a single column or row, and a summation amplifier having a feedback loop that is connected into each of the pre-amplifiers. This particular circuit arrangement offers minimal gain sensitivity of the output of the summation amplifier to variations in the gains or transconductances of the individual pre-amplifiers. This advantage can be of critical importance in precise scientific measurements that would otherwise require precise matching of individual transconductances of transistors at the ends of the columns or rows of the charge transfer device. Another advantage of this aspect of the invention is that it enables the entire summation circuitry, in certain embodiments, to be conveniently incorporated into the same semiconductor chip that includes the pixel array.

Another aspect of the invention features a random access charge transfer device in which it is possible to simultaneously read electric charge stored within each detection element (pixel) in at least one selected column or row.

By providing column or row selectors configured to select at least one column or row for charge reading, and by providing charge transfer circuitry and charge reading circuitry that provide for simultaneous reading of electric charge stored in each detection element (pixel) in the selected column or row, this aspect of the invention provides a collective reading arrangement uniquely useful for 1-dimensional spectroscopy applications. Specifically, the ability to collectively read the charge on an entire column or row makes it possible to simultaneously read all detection elements (pixels) associated with a given spectral line, thereby substantially increasing reading speed while substantially reducing read noise. In addition, prior to the simultaneous read, it is possible to individually scan each of the detection elements while the array of detection elements generates and stores electric charge in response to receipt of radiation, in order to identify a detection element associated with an unwanted high-energy event and eliminate the electric charge stored in that particular detection element from the simultaneous read (e.g., by not including the detection element in the simultaneous read, or by injecting the charge out of the detection element prior to the read).

Another aspect of the invention features a random access charge transfer device in which it is possible to simultaneously cause injection of some or all of the electric charge stored in each detection element in one of any desired combination of columns and also in one of any desired combination of rows, or to simultaneously cause injection of some or all of the electric charge stored in each detection element in at least one selected column or row. Injection of some of the electric charge stored in a detection element is sometimes referred to as "skimming."

By providing appropriate column and row selectors configured to select the desired columns or rows for charge reading, and by providing charge injection circuitry for simultaneously causing injection of electric charge stored in the appropriate detection elements, this aspect of the invention provides improved injection stability and accuracy due to the increased amount of time available for the application of an appropriate voltage potential to the entire region to be injected and due to elimination of extraneous clock signals during the injection process. The improvement in injection stability and accuracy in turn affects accuracy of linear dynamic range measurements. Also, the invention reduces the overall processing time required for charge injection due to the "parallel processing" nature of the invention. Moreover, injection cross talk is reduced because all detection elements in the region of interest are simultaneously held in the charge injection state. All of these advantages are obtained in the context of 1) simultaneous injection of electric charge stored in any desired combination of columns and rows, which is uniquely useful for injection of charge in spectroscopy applications and collective injection of the total charge contained in arbitrary areas of an image, or 2) simultaneous injection of electric charge stored in each detection element in a selected column or row, which is an arrangement uniquely useful for injection of charge in 1-dimensional spectroscopy applications.

DETAILED DESCRIPTION

Figure 1:
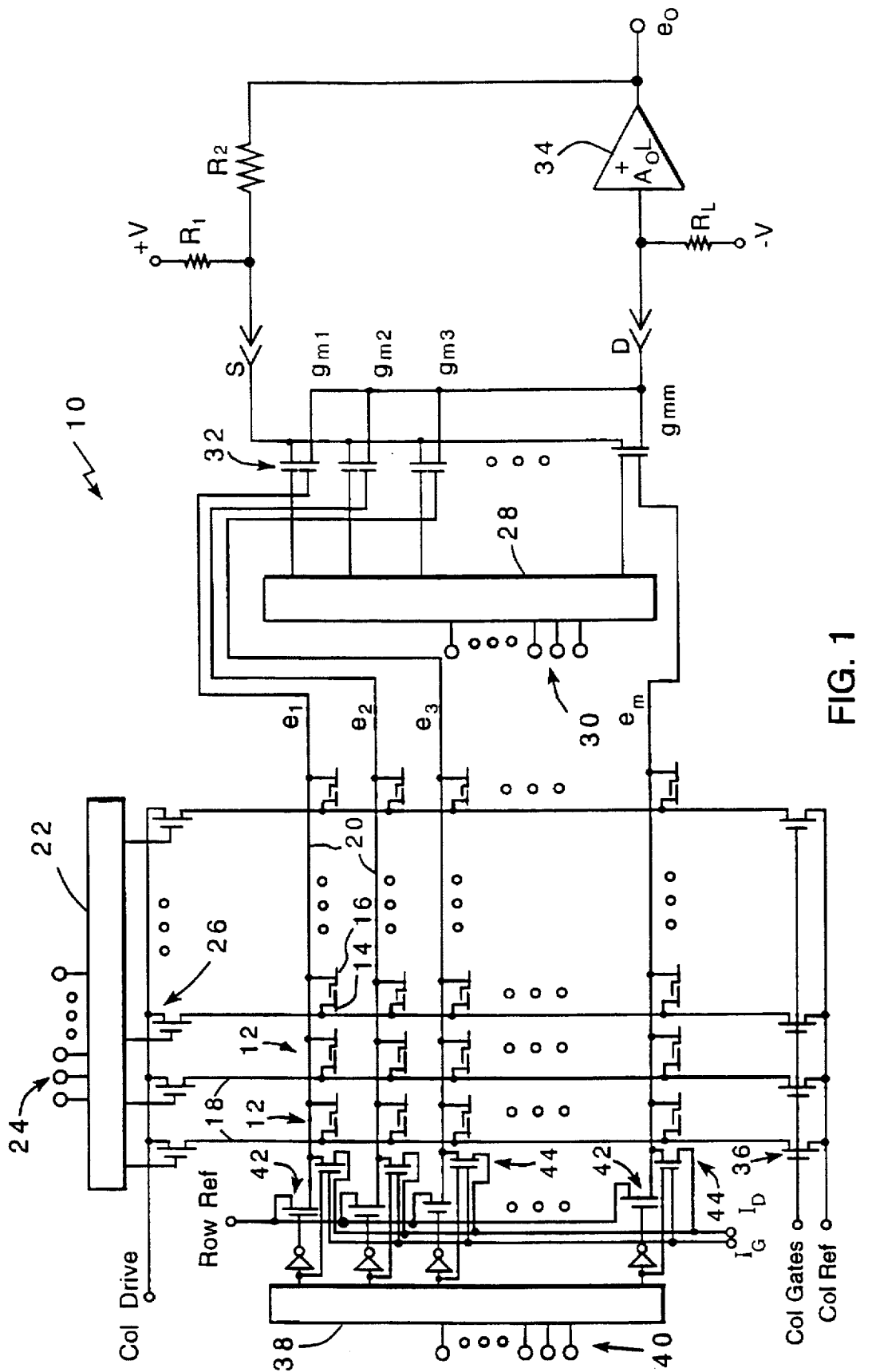
FIG. 1 is a circuit diagram of a charge injection device in accordance with the invention.

With reference to FIG. 1, charge injection device circuitry 10, which in certain embodiments can be implemented on a single semiconductor chip, includes an array of detector elements or pixels 12, each of which includes a pair of capacitance plates 14, 16, one of which is connected to one of column electrodes 18 and the other of which is connected to one of row electrodes 20.

At any given point of time, each of detector elements 12 can either integrate charge that generated in response to receipt of radiation by the detector element, be cleared of photon charge collected by the detector element (this is known as "charge injection"), or undergo a non-destructive read of charge collected by the detector element.

During the charge integration process, a computer system (not shown) activates the gates of each of column ref. MOSFET devices 36, thereby causing the "column ref" voltage potential to be applied to each of column electrodes 18. At the same time, row decoder 38 decodes an input signal received from the computer system over input lines 40 and causes the "row ref" voltage potential to be applied to a corresponding one or a corresponding multiplicity of row electrodes 18 by activating the gates of row drive MOSFET devices 42.

Figure 2:
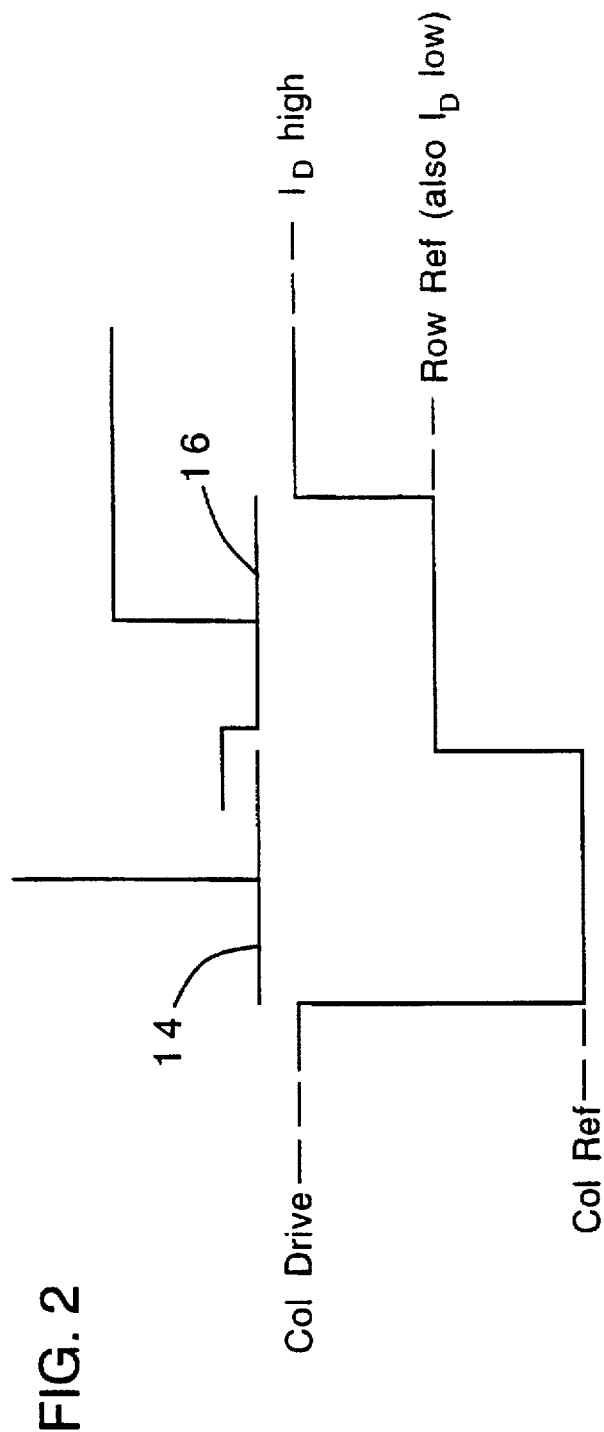
FIG. 2 is a diagram of the voltage potential wells beneath the column and row capacitance plates in a pixel of the charge injection device of FIG. 1.

This causes the voltage potential wells under capacitance plates 14 and 16 in the selected rows to be set as shown in FIG. 2, and electric charge received by the detection element or pixel collects in the well under capacitance plate 14, which is deeper than the well under capacitance plate 16.

During the charge injection process, column decoder 22 decodes an input signal received from the computer system over input lines 24 and causes the "column drive" voltage potential to be applied to a corresponding one or a corresponding multiplicity of column electrodes 18 by activating the gates of column drive MOSFET devices 26. This causes the voltage potential well under capacitance plate 14 in FIG. 2 to rise to the level represented by "Col Drive."

Figure 3:
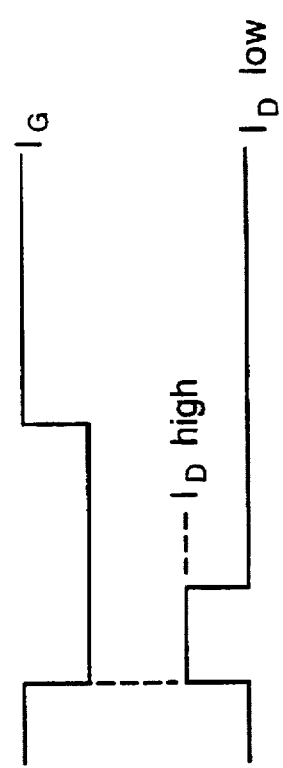
FIG. 3 is a timing diagram of the injection gate and injection drain signals used in connection with the charge injection device of FIG. 1.

At the same time row decoder 38 decodes an input signal received from the computer system over input lines 40 and causes the "injection drain" voltage potential $I_D$ to be applied to a corresponding one or a corresponding multiplicity of row electrodes 18 by activating one of the gates of dual-gate row injection MOSFET devices 44, while the "injection gate" voltage potential $I_G$ and the "injection drain" voltage potential $I_D$ undergo the transitions shown in FIG. 3. When $I_D$ goes high as shown in FIG. 3, the voltage potential wells in the selected row or rows rise to the level represented by "$I_D$ high."

Thus, both of the voltage potential wells shown in FIG. 2 disappear for each detection element or elements that is selected for injection, and the charge collected in the voltage potential wells is injected into the underlying substrate material.

It can be seen that any desired combination of columns and rows can be selected for charge injection by applying appropriate signals to input lines 24 and 40, and every detection element 12 that is in one of the desired combination of columns and also in one of the desired combination of rows will undergo charge injection. Thus, the circuitry of FIG. 1 enables random access selection of any single pixel or the "binning" of any group of pixels together to effectively form a single element. Pixel injection can be performed on a single pixel, or simultaneously on a group of pixels within an arbitrary user-defined region of interest (ROI) in a single process operation, without affecting pixel charge outside the region of interest in other portions of the imager.

It can be seen that the circuitry of FIG. 1 reduces the overall processing time for performing charge injection on a group of pixels, due to the parallel processing nature of the approach. Because of this, $I_D$ can be held high for a long time period to increase accuracy and stability of the charge injection. Also, the elimination of extraneous clock signals during charge injection of the region of interest further improves stability and accuracy. This ultimately improves accuracy of linear dynamic range measurements. Furthermore, because all pixels in the region of interest are simultaneously held in the injection state, injection cross talk is reduced.

The term "charge injection" as used herein is intended to encompass a process sometimes referred to as "charge skimming," in which $I_D$ is increased to a level somewhat less than "$I_D$ high" shown in FIG. 3. This clears all charge in a given detection element that exceeds a certain threshold. By selecting the level of "$I_D$ high" it is possible to select the threshold.

During the reading process, column decoder 22 decodes an input signal received from the computer system over input lines 24 and causes the "column drive" voltage potential to be applied to a corresponding one or a corresponding multiplicity of column electrodes 18 by activating the gates of column drive MOSFET devices 26. This causes the voltage potential well under capacitance plate 14 in FIG. 2 to rise to the level represented by "Col Drive," and any electric charge stored under capacitance plate 14 is transferred into the voltage potential well under capacitance plate 16.

Also during the reading process, row decoder 28 decodes an input signal received from the computer system over input lines 30 and activates one of the gates of a corresponding one or a corresponding multiplicity dual-gate MOSFET pre-amplifiers 32. The other gate of each dual-gate MOSFET pre-amplifiers 32 is connected to a respective one of row electrodes 20, and the drains of pre-amplifiers 32 are all connected to a single non-inverting input of off-chip or on-chip amplifier 34. The output of amplifier 34 is connected by a feedback loop to the source of each of MOSFET pre-amplifier 32.

The voltage on each row electrode 20 represents the summation of charge collected by each detection element 12 in the row in which the "column drive" voltage potential has been applied to the corresponding column electrode. The output signal $e_o$ of amplifier 34 represents a summation of the voltages on each of the selected row electrodes 20.

It can be seen that any desired combination of columns and rows can be selected for reading by applying appropriate signals to input lines 24 and 40, and that the output of amplifier 34 represents the summation of the charge collected by each detection element in one of the desired combination of columns and also in one of the desired combination of rows. The collective reading provides improved signal-to-noise and improved reading speed, all in the context of a non-destructive reading.

The substitution of dual-gate pre-amplifiers 32 for conventional row (or column) select switches not only improves the signal-to-noise ratio of the charge injection device, but also provides the means to connect one or more pre-amplifier drain nodes to amplifier 34. The "on-chip" collective reading offers the noise advantages of pre-amp per row (PPR) reading, but does not require multiple external ancillary amplifiers that are needed to complete the collective pixel reading process off-chip.

For precise scientific measurements, the summation of signals from a multiplicity of column amplifiers requires precise matching of individual transistor transconductance. The use of multiple-input amplifier 34, incorporating feedback to a common FET source connection, and the combination of more than one non-inverting input with a conventional inverting input, provides a means to reduce signal gain sensitivity to variations in individual pre-amplifier transconductance.

Multiple-input feedback amplifier 34 makes the overall gain a function of the external feedback resistor network and substantially reduces the read signal gain sensitivity to variations of individual pre-amplifier gains. The amount of degeneration introduced is determined by the forward amplifier gain.

Figure 4:
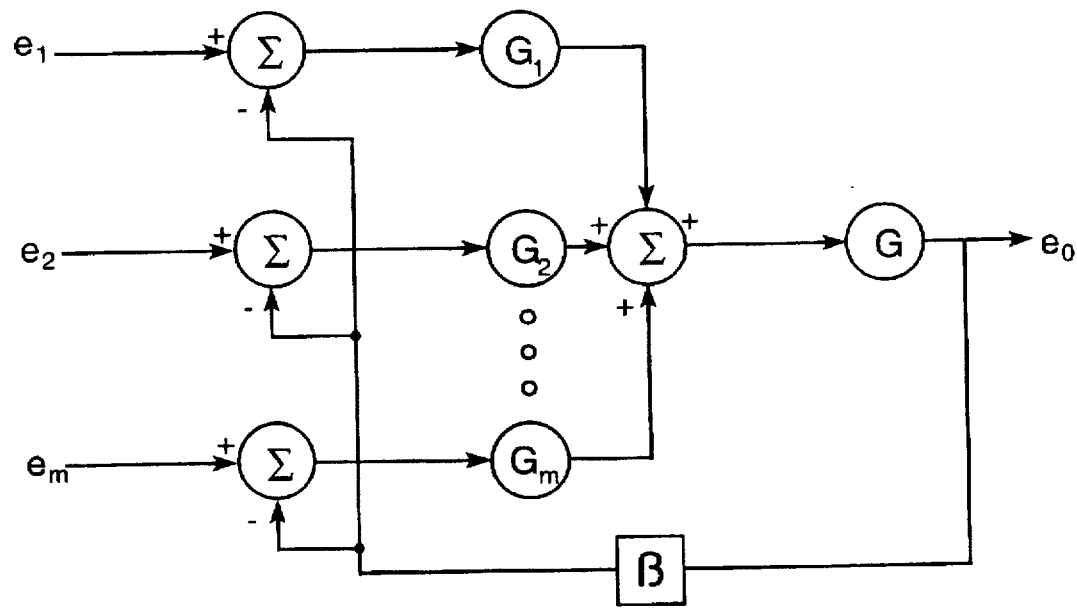
FIG. 4 is a signal flow diagram corresponding to the summation circuitry of the charge injection device of FIG. 1.

Referring to FIG. 4, there is shown a signal flow diagram corresponding to the summation circuitry of the charge injection device of FIG. 1, where $G_1=g_{m1}R_L$, $G_2=g_{m2}R_L$, etc., and where $G=A_oL$ and $\beta=R_1/(R_1+R_2)$.

Ignoring frequency and FET output impedance effects, and assuming the pre-amplifiers are relatively well matched, $$e_o=G[G_1(e_1-\beta e_o)+G_2(e_2-\beta e_o)+\ldots+G_m(e_m-\beta e_o)].$$

Thus, $$e_o=G[\Sigma G_m e_m-\beta e_o\Sigma G_m].$$

If $G_1=G_2=G_3=\ldots=G_m$, then $$e_o=GG_m\Sigma e_m-mGG_m\mu e_o.$$

Thus, $$e_o/\Sigma e_m=GG_m/[1+mGG_m\mu].$$

Taking the limit as $m\beta GG_m\gg 1$, the result is $$e_o/\bar{e}_m=1/\beta,$$

which is the standard feedback expectation.
Similarly, $$e_o[1+\beta G\Sigma G_m]=G\Sigma G_m e_m.$$

Thus, $$e_o[1/\Sigma G_m+\beta G]=G\Sigma G_m e_m/\Sigma G_m=G\bar{e}_m,$$

and $$e_o/\bar{e}_m=G\Sigma G_m/[1+\beta G\Sigma G_m].$$

Again, if $\beta G\Sigma G_m\gg 1$, then $e_o/\bar{e}_m=1/\beta$.

If we examine a two-input case, we can determine the sensitivity of the closed loop gain to variations in $G_1$ or $G_2$. In particular, $$e_o=G[G_1(e_1-\beta e_o)+G_2(e_2-\beta e_o)].$$

If $e_1=e_2=e_{in}$, then $e_o=G(G_1+G_2)e_{in}-\beta G(G_1+G_2)e_o$.
Thus, $$e_o[1+\beta G(G_1+G_2)]=G(G_1+G_2)e_{in}.$$

The closed loop gain, $A=e_o/e_{in}=G(G_1+G_2)/[1+\beta G(G_1+G_2)]$.

The sensitivity of the closed loop gain to $G_1$ or $G_2$ is $dA/dG_1=1/[1+\beta G(G_1+G_2)]^2$.

If, for example, $G_1=G_2=G_o=10$, $G=A_oL=10^4$, and $\beta=1/40$, then $$dA/dG_1=1/[1+10^4(10+10)/40]=4/10^8.$$

If $G_1$ varies by 10 percent (an increment of 1), then $dA=4/10^8$.

Thus, the read signal gain sensitivity to variations of individual pre-amplifier gains is minimal.

When a group of pixels in the circuitry of FIG. 1 are simultaneously read, the read noise associated with the collective read is less than the collective noise associated with separate reads of all of the individual pixels. The collective reading not only reduces read noise as compared with conventional reading, but also increases the read speed. The time required to select and read any number of pixels in a region of interest is about the same as the time for reading a single pixel. This increase in speed can be converted into a further reduction in read noise by employing multiple non-destructive reads, in which the charge from multiple pixels is sampled, but the charge from each pixel never leaves that pixel. This means that the number of carriers that can be sampled can be larger than the charge capacity (or full well) of a single pixel.

If the region of interest contains a "cosmic ray event" (caused by a high-energy particle hitting the detector and causing a very high signal level in a single pixel or a small set of pixels), which can especially occur during long integration times associated with low-light imaging, the rest of the image on the charge injection device remains unchanged, so that the pixels in the region of interest can be individually sampled, during integration, to determine the pixel or pixels containing the event. If several samples are performed, non-linearities in integration of charge in each pixel can be readily noticed. The electric charge in a pixel containing such an event can be, in effect, digitally subtracted from the image, either by performing a charge injection on-chip on the pixel prior to reading or by excluding the pixel from the read. The computer system can compensate for the absence of such a pixel by multiplying the total charge read from the region of interest by an appropriate factor. The charge injection device loses only the information contained in the one pixel associated with the event rather than all the information in the region of interest that is read collectively.

The collective reading capability provided by the circuitry of FIG. 1 avoids blooming problems (spillage of charge from one pixel out to adjacent pixels when the charge is more than one pixel can hold) because the charge of the pixels in the region of interest is not collected into a single pixel.

Circuitry of the type shown in FIG. 1 is especially useful in Echelle spectroscopic applications such as atomic emission and absorbance. The regions of interest in these spectroscopies are small and precisely located. The sub-array that is examined is usually 15 columns wide by 3 rows high, which covers both the analytical signal (3×3) in the center, and two background (2×3) regions on either side of the center. With the application of row binning, the background reading can be reduced from 12 reads to 4 reads, with a reduction in noise and a 3-fold increase in speed. The central signal intensity can be read in 3 reads rather than 9, with a similar reduction in read noise and gain in speed. With the addition of column binning, the two background regions can be examined in two reads, with a reduction in read noise, and the signal intensity can be read out in one read, with a reduction in read noise. The 75 pixel reads otherwise required for the sub-array are reduced to 3 binned reads, at faster speed. The reduction in read noise is especially important to atomic emission because it yields better detection limits, while the speed increase best benefits atomic absorbance because more transient signals can be observed at the high frame rates required.

Applications of the collective reading provided by circuitry of the type shown in FIG. 1 to general imaging provides several key advantages including lower light detection, greater speed, flexible array formatting, and image preview. The collective reading can increase the dynamic range of light detection by summing the signals from many pixels with low signal levels. This will increase the signal to noise ratio for a dim, read noise limited area without affecting strongly illuminated, shot noise limited areas, and with an increase in speed rather than a decrease such as can occur with multiple nondestructive reads. The collective reading increases speed relative to normal reading, but at the cost of resolution. The loss of resolution is not necessarily a disadvantage for imaging because some parts of the image may not require the same detail as others. For example, a microscope image of an integrated circuit will not require as much resolution for the bonding pads as it will for the circuit traces. The combination of collective reading and increased reading speed can be used to rapidly acquire a preview image so that regions of interest can be identified for a slower, high-resolution analysis. For example, if the read speed is tripled and four pixels per row or column are collectively read, than the entire charge injection device can be read out twelve times faster than usual. For a 1K×1K device with a maximum pixel clock of 200 kHz, a 4× bin would require only 1.3 seconds to read out.

Figure 5:
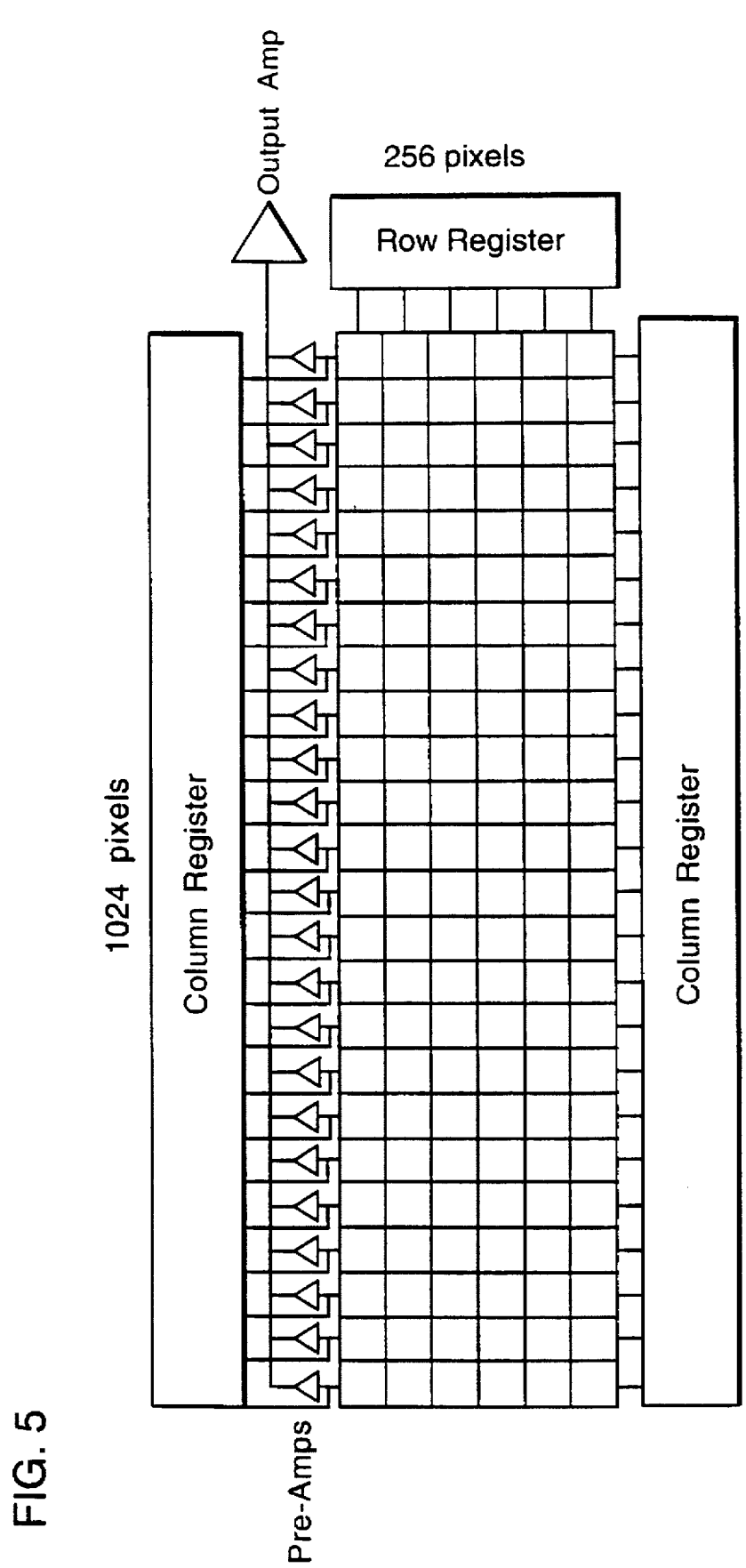
FIG. 5 is a diagram of a charge injection device especially useful in connection with linear spectroscopy applications.

With reference to FIG. 5, there is shown a charge injection device particularly useful in connection with 1-dimensional, linear dispersion spectroscopy. This device includes collective reading circuitry and collective injection circuitry analogous to that shown in FIG. 1 (with rows and columns inverted with respect to each other).

The 256 pixels in each column can all be read simultaneously. The charge injection device has a 1024×256 square pixel (28 μm) format with a pre-amp on each column. The general configuration is a rectangular device that matches the dispersion format, with sense amplifiers on the short axis. As drawn, spectral lines fall vertically on the device while wavelengths are dispersed left to right.

The addressing and drive electronics allows random collective reading. In particular, the ability to collectively read the charge on an entire column means that each column can be examined in a single read. By collectively reading the charge on all pixels associated with a single sense amplifier it is possible to read all the charge generated by photons at a single wavelength. This reduces the total number of reads by the number of pixels along a sense line (column). This equates to reducing about 256,000 reads to 1024, and thus the reading will also be 256 times faster than reading out the entire frame. If the pixel clock frequency is 100 kHz, then the device could be read at about 10 frames per second.

Additionally, this approach reduces the effective contribution of read noise (compared to the collective read noise associated with reading each pixel separately). The time saved in this procedure could be used to implement multiple non-destructive reads, further reducing the system read noise.

In extremely low-light situations (sometimes encountered in Raman spectroscopy, phosphorescence spectroscopy, etc.), the non-destructive read mode can be used to scan the entire pixel array to determine the presence of pixels containing an abnormally high charge due to factors other than the observed photon flux (so-called hot pixels, cosmic rays, radioactive events, and so forth), in the manner described above. On detection of this abnormality, the system can either destructively inject (clear) the offending pixel or merely refrain from "sloshing" the charge of the offending pixel onto the sense line. This process prevents the inclusion in the signal of the spurious signal from the abnormal pixel.

This spectroscopic charge injection device is ideally suited for use in UV-Vis, fluorescence, and Raman spectroscopies. The rapid frame rate afforded by collective reading means it can be used in on-line process monitoring and control and in common analytical applications such as high-performance liquid chromatography (HPLC) and thin layer chromatography (TLC). Because there are 256 rows, multiple spectra can be acquired simultaneously on the device. For example, ten separate spectra, each covering 25 rows, can be acquired every second.

Other embodiments are within the following claims. For example, it is axiomatic that columns can be substituted for the rows shown in the drawings and rows can be substituted for the columns. Furthermore, the inventions are equally applicable to other random access charge transfer devices such as pre-amp per pixel (PPP) devices (sometimes referred to as active pixel sensors), etc.

What is claimed is:

1. A method of reading electric charge stored in a plurality of detection elements in a random access charge transfer device, comprising the steps of:

providing a random access charge transfer device, comprising an array of detection elements constructed to generate and store electric charge in response to receipt of radiation, a plurality of column electrodes electrically connected to each detection element in a respective plurality of columns of said array, a plurality of row electrodes electrically connected to each detection element in a respective plurality of rows of said array, at least one column selector configured to receive an input identifying any desired combination of said columns and to select said desired combination of columns for charge reading, and at least one row selector configured to receive an input identifying any desired combination of said rows and to select said desired combination of rows for charge reading;

selecting a desired combination of columns for charge reading;

selecting a desired combination of rows for charge reading;

causing a transfer of electric charge stored within each detection element in one of said selected combination of columns and also in one of said selected combination of rows;

reading electric charge stored within each detection element in one of said selected combination of columns and also in one of said selected combination of rows in at least a partially non-simultaneous manner in order to search for unwanted high-energy events affecting said electric charge stored within at least one of said detection elements;

injecting charge out of said at least one of said detection elements;

subsequent to said steps of reading electric charge and injecting charge, simultaneously reading electric charge stored within each detection element in one of said selected combination of columns and also in one of said selected combination of rows; and determining the total amount of said electric charge read in said simultaneous reading step, and performing a mathematical calculation on said total amount that compensates for absence of electric charge from said at least one of said detection elements.

2. A method in accordance with claim 1, further comprising the steps of:

determining the total amount of said electric charge read in said simultaneous reading step in order to determine that said selected combination of columns and said selected combination of rows define a region of interest; and reading electric charge stored within each detection element in one of said selected combination of columns and also in one of said selected combination of rows in at least a partially non-simultaneous manner, in order to obtain detailed information pertaining to said region of interest.

3. A method in accordance with claim 1, wherein said desired combination of columns and said desired combination of rows define a region expected to contain a level of charge per detection element substantially lower than a level of charge per detection element in a location outside said region.

4. A method in accordance with claim 1, wherein said desired combination of columns and said desired combination of rows define a region expected to contain a level of charge per detection element that tends to vary less between adjacent detection elements than a level of charge per detection element in a location outside said region.

5. A method in accordance with claim 1, wherein said desired combination of columns and said desired combination of rows define a region corresponding to an analytical signal obtained in a spectroscopic imaging process.

6. A method in accordance with claim 5, wherein said spectroscopic imaging process is a 2-dimensional spectroscopic imaging process, and said region is substantially 2-dimensional.

7. A method in accordance with claim 5, wherein said spectroscopic imaging process is a 1-dimensional spectroscopic imaging process, and said region is substantially 1-dimensional.

8. A method in accordance with claim 1, wherein said desired combination of columns and said desired combination of rows define a background region corresponding to an absence of analytical signal of interest obtained in a spectroscopic imaging process.

9. A method in accordance with claim 1, wherein said step of simultaneously reading said electric charge comprises simultaneously producing a plurality of outputs, each of which comprises a summation of electric charge stored within detection elements in a single column or row.

10. A method in accordance with claim 9, further comprising the step of summing each of said outputs together.

11. A method of reading electric charge stored in a plurality of detection elements in a random access charge transfer device, comprising the steps of:

providing a random access charge transfer device, comprising an array of detection elements constructed to generate and store electric charge in response to receipt of radiation, a plurality of column electrodes electrically connected to each detection element in a respective plurality of columns of said array, a plurality of row electrodes electrically connected to each detection element in a respective plurality of rows of said array, at least one column selector configured to receive an input identifying any desired combination of said columns and to select said desired combination of columns for charge reading, and at least one row selector configured to receive an input identifying any desired combination of said rows and to select said desired combination of rows for charge reading;

selecting a desired combination of columns for charge reading;

selecting a desired combination of rows for charge reading;

causing a transfer of electric charge stored within each detection element in one of said selected combination of columns and also in one of said selected combination of rows;

reading electric charge stored within each detection element in one of said selected combination of columns and also in one of said selected combination of rows in at least a partially non-simultaneous manner in order to search for unwanted high-energy events affecting said electric charge stored within at least one of said detection elements;

subsequent to said step of reading electric charge, simultaneously reading electric charge stored within each detection element in one of said selected combination of columns and also in one of said selected combination of rows in a manner that excludes said at least one of said detection elements; and determining the total amount of said electric charge read in said simultaneous reading step, and performing a mathematical calculation on said total amount that compensates for absence of electric charge from said at least one of said detection elements.

12. A method of reading electric charge stored in a plurality of detection elements in a random access charge transfer device, comprising the steps of:

providing a random access charge transfer device, comprising an array of detection elements constructed to generate and store electric charge in response to receipt of radiation, a plurality of column electrodes electrically connected to each detection element in a respective plurality of columns of said array, a plurality of row electrodes electrically connected to each detection element in a respective plurality of rows of said array, at least one column selector configured to receive an input identifying any desired combination of said columns and to select said desired combination of columns for charge reading, and at least one row selector configured to receive an input identifying any desired combination of said rows and to select said desired combination of rows for charge reading;

selecting a desired combination of columns for charge reading;

selecting a desired combination of rows for charge reading;

causing a transfer of electric charge stored within each detection element in one of said selected combination of columns and also in one of said selected combination of rows;

while said array of detection elements generates and stores electric charge in response to receipt of radiation, reading electric charge stored within each detection element in one of said selected combination of columns and also in one of said selected combination of rows in at least a partially non-simultaneous manner in order to search for unwanted high-energy events affecting said electric charge stored within at least one of said detection elements;

successively repeating said step of reading charge in at least a partially non-simultaneous manner; and successively comparing the amount of said electric charge read from at least one of said detection elements in each successive repetition of said step of reading charge in at least a partially non-simultaneous manner, in order to search for non-linearities in electric charge stored within said at least one of said detection elements as an indicator of an unwanted high-energy event; and subsequent to said step of reading electric charge, simultaneously reading electric charge stored within each detection element in one of said selected combination of columns and also in one of said selected combination of rows.

13. A random access charge transfer device, comprising:

an array of detection elements constructed to generate and store electric charge in response to receipt of radiation;

a plurality of column electrodes electrically connected to each detection element in a respective plurality of columns of said array;

a plurality of row electrodes electrically connected to each detection element in a respective plurality of rows of said array;

at least one column or row selector configured to select a combination of columns or rows for charge reading;

charge transfer circuitry connected between said column selector and each of said column electrodes, or between said row selector and each of said row electrodes, for causing a transfer of electric charge stored within detection elements in said selected combination of columns or rows;

charge reading circuitry connected to each of said column or row electrodes for simultaneously reading electric charge stored within detection elements in said selected combination of columns or rows, said charge reading circuitry comprises a plurality of pre-amplifiers connected to said column or row electrodes for simultaneously producing a plurality of outputs, each of which corresponds to electric charge stored within at least one detection element in a single column or row; and summation circuitry, connected to each of said outputs of said charge reading circuitry, for summing together said plurality of outputs of said charge reading circuitry, said summation circuitry comprising an amplifier having a feedback loop that is connected into and functions as an input to each of said pre-amplifiers.

14. A random access charge transfer device in accordance with claim 13, wherein said pre-amplifiers are dual-gate pre-amplifiers, one gate of which is connected to respective ones of said columns or row electrodes to which said charge reading circuitry is connected, and another gate of which is connected to respective outputs of said at least one column or row selector.

15. A random access charge transfer device in accordance with claim 13, wherein said pre-amplifiers comprise MOSFET devices having drains connected to an input of said summation circuitry and sources connected to said feedback loop.

16. A random access charge transfer device in accordance with claim 13, wherein said summation circuitry is implemented on a semiconductor chip that also comprises said array, said column electrodes, said row electrodes, and said charge reading circuitry.

17. A random access charge transfer device in accordance with claim 13, wherein said pre-amplifiers have gains greater than one.

18. A random access charge transfer device in accordance with claim 13, comprising at least one column selector configured to receive an input identifying any desired combination of said columns and to select said desired combination of columns for charge reading, and at least one row selector configured to receive an input identifying any desired combination of said rows and to select said desired combination of rows for charge reading, and wherein said charge transfer circuitry is configured to cause a transfer of electric charge stored within each detection element in one of said selected combination of columns and also in one of said selected combination of rows, and wherein said charge reading circuitry is configured for simultaneously reading electric charge stored within each detection element in one of said selected combination of columns and also in one of said selected combination of rows.

19. A random access charge transfer device in accordance with claim 14, wherein said feedback loop is connected into a source of each of said dual-gate pre-amplifiers.

20. A method of reading electric charge stored in a plurality of detection elements in a random access charge transfer device, comprising the steps of:

providing a random access charge transfer device comprising an array of detection elements constructed to generate and store electric charge in response to receipt of radiation, a plurality of column electrodes electrically connected to each detection element in a respective plurality of columns of said array, and a plurality of row electrodes electrically connected to each detection element in a respective plurality of rows of said array:

generating and storing electric charge in said array of detection elements during an imaging process:

non-destructively reading electric charge stored within each detection element in at least a portion of said array in at least a partially non-simultaneous manner, in order to search for unwanted high-energy events affecting said electric charge stored within at least one of said detection elements; and subsequently reading electric charge stored within each detection element in at least a portion of said array, in conjunction with a compensation operation that compensates for an effect on said electric charge due to unwanted high-energy events found during said searching step.

21. A method in accordance with claim 20, wherein said compensation operation comprises injecting charge out of said at least one of said detection elements prior to said step of subsequently reading said electric charge.

22. A method in accordance with claim 21, wherein said step of subsequently reading electric charge is performed simultaneously on a plurality of said detection elements, and wherein said compensation operation comprises determining the total amount of said electric charge read in said simultaneous reading step, and performing a mathematical calculation on said total amount that compensates for absence of electric charge from said at least one of said detection elements.

23. A method in accordance with claim 20, wherein said step of non-destructively reading electric charge in at least a partially non-simultaneous manner is performed while said array of detection elements generates and stores electric charge in response to receipt of radiation.

24. A method in accordance with claim 23, further comprising the steps of:
   successively repeating said step of non-destructively reading charge in at least a partially non-simultaneous manner; and
   successively comparing the amount of said electric charge read from at least one of said detection elements in each successive repetition of said step of non-destructively reading charge in at least a partially non-simultaneous manner, in order to search for non-linearities in electric charge stored within said at least one of said detection elements as an indicator of an unwanted high-energy event.

25. A random access charge transfer device, comprising:
   an array of detection elements constructed to generate and store electric charge in response to receipt of radiation;
   a plurality of column electrodes electrically connected to each detection element in a respective plurality of columns of said array;
   a plurality of row electrodes electrically connected to each detection element in a respective plurality of rows of said array;
   a column selector configured to receive an input identifying any desired combination of said columns and to select said desired combination of columns for injection of electric charge out of detection elements in said desired combination of columns;
   a row selector configured to receive an input identifying any desired combination of said rows and to select said desired combination of rows for injection of electric charge out of detection elements in said desired combination of rows;
   charge injection circuitry, connected between said column or row selector and each of said column or row electrodes, for simultaneously causing injection of electric charge stored in each detection element in one of said selected combination of columns and also in one of said selected combination of rows, independently of reading of the electric charge.

26. A random access charge transfer device in accordance with claim 25, wherein said charge injection circuitry is configured to cause injection of substantially all of said electric charge stored within said detection elements.

27. A random access charge transfer device in accordance with claim 25, wherein said charge injection circuitry is configured to cause injection of electric charge stored within said detection elements that exceeds a threshold.

28. A random access charge transfer device in accordance with claim 27, wherein said threshold is selectable.

29. A method of injecting charge out of a plurality of detection elements in a random access charge transfer device, comprising the steps of:
   providing a random access charge transfer device comprising an array of detection elements constructed to generate and store electric charge in response to receipt of radiation, a plurality of column electrodes electrically connected to each detection element in a respective plurality of columns of said array, a plurality of row electrodes electrically connected to each detection element in a respective plurality of rows of said array, a column selector configured to receive an input identifying any desired combination of said columns and to select said desired combination of columns for injection of electric charge out of detection elements in said desired combination of columns, and a row selector configured to receive an input identifying any desired combination of said rows and to select said desired combination of rows for injection of electric charge out of detection elements in said desired combination of rows; and
   simultaneously causing injection of electric charge stored in each detection element in one of said selected combination of columns and also in one of said selected combination of rows, independently of reading of the electric charge.

30. A method in accordance with claim 29, wherein said step of simultaneously causing injection of electric charge comprises causing injection of substantially all of said electric charge stored within said detection elements.

31. A method in accordance with claim 29, wherein said step of simultaneously causing injection of electric charge comprises causing injection of electric charge stored within said detection elements that exceeds a threshold.

32. A method in accordance with claim 31, further comprising the step of selecting said threshold.

33. A random access charge transfer device, comprising:
   an array of detection elements constructed to generate and store electric charge in response to receipt of radiation;
   a plurality of column electrodes electrically connected to each detection element in a respective plurality of columns of said array;
   a plurality of row electrodes electrically connected to each detection element in a respective plurality of rows of said array;
   at least one column or row selector configured to receive an input identifying at least one of said columns or rows and to select said at least one column or row for injection of electric charge out of each detection element in said at least one column or row;
   charge injection circuitry, connected between said column or selector and each of said column or row electrodes, for simultaneously causing injection of electric charge stored in each detection element in said at least one selected column or row, independently of reading of the electric charge.

34. A method of injecting charge out of a plurality of detection elements in a random access charge transfer device, comprising the steps of:
   providing a random access charge transfer device comprising an array of detection elements constructed to generate and store electric charge in response to receipt of radiation, a plurality of column electrodes electrically connected to each detection element in a respective plurality of columns of said array, a plurality of row electrodes electrically connected to each detection element in a respective plurality of rows of said array, and at least one column or row selector configured to receive an input identifying at least one of said columns or rows and to select said at least one column or row for injection of electric charge out of each detection element in said at least one column or row; and simultaneously causing injection of electric charge stored in each detection element in said at least one selected column or row, independently of reading of the electric charge.

35. A method of reading electric charge stored in a plurality of detection elements in a random access charge transfer device, comprising the steps of:

providing a random access charge transfer device, comprising an array of detection elements constructed to generate and store electric charge in response to receipt of radiation, a plurality of column electrodes electrically connected to each detection element in a respective plurality of columns of said array, a plurality of row electrodes electrically connected to each detection element in a respective plurality of rows of said array, at least one column selector configured to receive an input identifying any desired combination of said columns and to select said desired combination of columns for charge reading, and at least one row selector configured to receive an input identifying any desired combination of said rows and to select said desired combination of rows for charge reading;

selecting a desired combination of columns for charge reading;

selecting a desired combination of rows for charge reading;

causing a transfer of electric charge stored within each detection element in one of said selected combination of columns and also in one of said selected combination of rows;

simultaneously, nondestructively reading electric charge stored within each detection element in one of said selected combination of columns and also in one of said selected combination of rows, and simultaneously reading, again, electric charge stored within each detection element in one of said selected combination of columns and also in one of said selected combination of rows, in order to reduce effective read noise.

36. A method in accordance with claim 35, wherein said desired combination of columns and said desired combination of rows define a region corresponding to an analytical signal obtained in a spectroscopic imaging process.

37. A method in accordance with claim 36, said spectroscopic imaging process is a 2-dimensional spectroscopic imaging process, and said region is substantially 2-dimensional.

38. A method of reading electric charge stored in a plurality of detection elements in a random access charge transfer device, comprising the steps of:

providing a random access charge transfer device, comprising an array of detection elements constructed to generate and store electric charge in response to receipt of radiation, a plurality of column electrodes electrically connected to each detection element in a respective plurality of columns of said array, a plurality of row electrodes electrically connected to each detection element in a respective plurality of rows of said array, and at least one column or row selector configured to receive an input identifying at least one of said columns or rows and to select said at least one column or row for charge reading;

selecting at least one column or row for charge reading;

causing a transfer of electric charge stored within each detection element in said at least one column or row;

simultaneously, nondestructively reading electric charge stored within each detection element in said at least one column or row, and simultaneously reading, again, electric charge stored within each detection element in said at least one column or row, in order to reduce effective read noise.

39. A method in accordance with claim 38, wherein said desired combination of columns and said desired combination of rows define a region corresponding to an analytical signal obtained in a spectroscopic imaging process.

40. A method in accordance with claim 39, said spectroscopic imaging process is a 1-dimensional spectroscopic imaging process, and said region is substantially 1-dimensional.

* * * * *